C. C. COUSENS.
SANITARY MILK AND CREAM SAVING DEVICE.
APPLICATION FILED JUNE 6, 1908.

920,545.

Patented May 4, 1909.

WITNESSES

INVENTOR
Charles C. Cousens
BY
ATTORNEYS

UNITED STATES PATENT OFFICE.

CHARLES C. COUSENS, OF SPRINGFIELD, MASSACHUSETTS.

SANITARY MILK AND CREAM SAVING DEVICE.

No. 920,545.   Specification of Letters Patent.   Patented May 4, 1909.

Application filed June 6, 1908. Serial No. 437,093.

*To all whom it may concern:*

Be it known that I, CHARLES C. COUSENS, a citizen of the United States, and a resident of Springfield, in the county of Hampden and State of Massachusetts, have invented a new and Improved Sanitary Milk and Cream Saving Device, of which the following is a full, clear, and exact description.

This invention relates to certain improvements in sanitary milk and cream-saving devices, adapted to be applied to a milk or cream cabinet for saving of the milk or cream spilled while filling glasses and mugs.

The device prevents the spilled milk from escaping into the ice chamber surrounding the milk can and returns the milk to the can in a clean and sanitary condition.

In the milk and cream cabinets commonly used in lunch rooms, it is practically impossible to prevent the milk or cream spilled while hastily filling glasses and mugs, from flowing into the ice chamber around the can. This necessitates the repeated cleaning of the interior of the ice chamber and the loss of the ice within the cabinet at the time the latter is cleaned. Should the milk or cream be permitted to remain within the ice chamber, it produces a very unsanitary condition. By preventing the admission of the milk to the ice chamber, the entire cabinet may be kept sweet and sanitary, and the ice chamber need be emptied and cleaned only at such intervals as the presence of impurities in the ice may demand.

The device may be readily removed to be cleaned, and when removed permits of a removal of the can through the opening in the cabinet top.

The device also serves to prevent the outside air from coming in contact with the ice, and thus prevents the latter from melting so rapidly.

Reference is to be had to the accompanying drawings forming a part of this specification, in which similar characters of reference indicate corresponding parts in both the figures, and in which—

Figure 1:
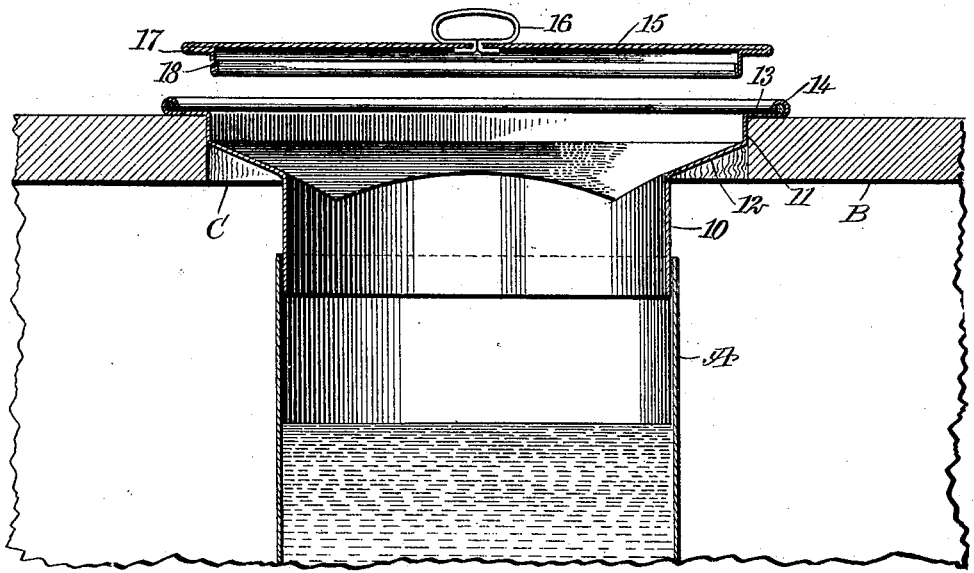
Figure 2:
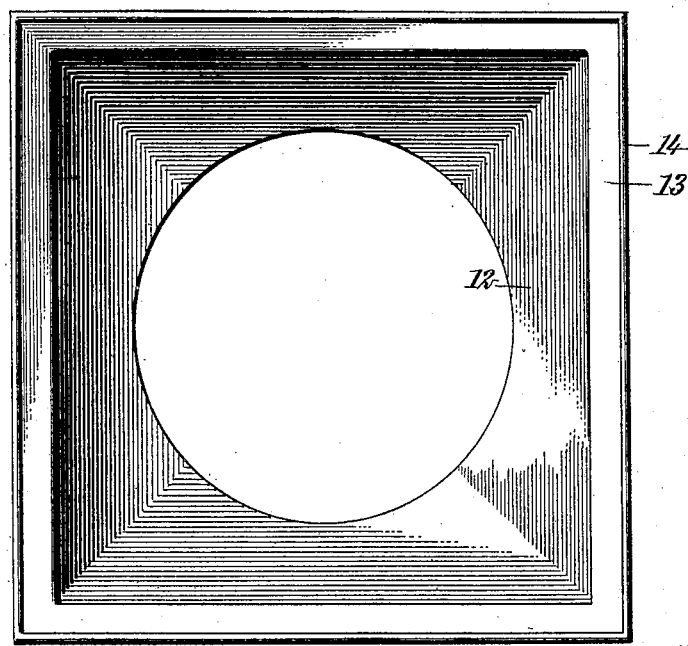

Figure 1 is a vertical section through a device constructed in accordance with my invention, and a portion of the can and cabinet in connection with which it is used; and Fig. 2 is a top plan view of my improved device.

In the specific form illustrated, the entire device is formed of sheet metal and is composed of five separate elements or parts. The lowermost portion comprises an annular collar or flange 10, adapted to fit within the mouth of the open upper end of the milk or cream can A, and may be of any suitable size depending upon the size of the can and the distance from the upper edge of the can to the top wall B of the inclosing cabinet. This lower terminal flange or collar extends a slight distance into the can and serves not only to direct the milk into the can, but also serves to support the upper end of the can against lateral movement. The top wall of the cabinet is provided with a rectangular opening C, and within this opening is a substantially rectangular vertical wall 11 of the device. The rectangular wall 11 is of considerably larger diameter than the collar or terminal flange 10, and is connected thereto by a beveled or inclined wall 12. This wall is made up of four separate sections corresponding to the four sides of the rectangular wall 11, and each section intersects the collar or flange 10 in a curved line.

At the upper end of the wall 11, I provide an outwardly-extending supporting flange 13, adapted to engage with the outer surface of the cabinet top B and serving to support the entire device from said cabinet top. The flange is of substantially uniform width and extends out over the top of the cabinet to any desired distance. At the outer edge of the flange 13, there is provided an upwardly-extending bead or flange 14, which serves to prevent milk spilled on the flange 13 from flowing out onto the cabinet top and also prevents any milk spilled on the cabinet top from flowing onto the flange 13 and thus into the can.

In connection with the improved device above described I preferably employ a cover 15, having any suitable form of handle 16, and at the outer edges having the sheet metal forming the cover bent back upon itself to form a reinforced peripheral edge 17. At the inner side of this reinforcement, the sheet metal is bent downward to form an annular flange 18, and at the lower edge of this flange it is bent backward to reinforce the same. The flange 18 is of such from and size as to fit within the wall 11, and the peripheral reinforced edge of the cover fits against the supporting flange 13 of the device and within the outer bead or flange 14.

Having thus described my invention, I claim as new and desire to secure by Letters Patent:

1. The combination with a milk can having an open upper end from which the milk may be dipped and an inclosing refrigerating cabinet having an aperture in the top thereof through which said can may be removed, of a milk-saving device having a supporting flange adapted to engage with the cabinet at the outer surface thereof, an annular depending flange of slightly smaller diameter than the open upper end of the can and adapted to fit within said open upper end to support the can against lateral displacement, and an intermediate connecting portion extending from the first-mentioned flange to the second-mentioned flange and serving to close the space between the upper end of the can and the cabinet and also serving to direct milk into the can.

2. The combination with a milk can having an open top through which the milk may be dipped, and an inclosing refrigerating cabinet having a top wall or cover provided with an opening through which the can may be removed, of a milk-saving device having a flat supporting flange adapted to engage with the outer surface of said top wall, an upwardly-extending bead or flange at the outer peripheral edge thereof, a depending wall at the inner edge of said first-mentioned flange and adapted to extend into said opening in the cabinet, an annular flange adapted to fit within the mouth of the can and hold the latter against lateral displacement, and a downwardly-inclined wall connecting said depending wall and said last-mentioned flange and closing communication between the interior of said can and the interior of said cabinet, and a cover having a depending flange adapted to fit within said depending wall of said device and having a laterally extending flange adapted to engage with the supporting flange of said device.

In testimony whereof I have signed my name to this specification in the presence of two subscribing witnesses.

CHARLES C. COUSENS.

Witnesses:
   JOHN O. PHILLIPS,
   T. H. McCoy.